US011938442B2

(12) United States Patent
Nakamura et al.

(10) Patent No.: US 11,938,442 B2
(45) Date of Patent: Mar. 26, 2024

(54) GAS SEPARATION SYSTEM (71) Applicant: UBE Corporation, Ube (JP)

(72) Inventors: Tomohide Nakamura, Ube (JP);
Nobuhiko Fukuda, Ube (JP)

(73) Assignee: UBE CORPORATION, Ube (JP)

( * ) Notice: Subject to any disclaimer, the term of this patent is extended or adjusted under 35 U.S.C. 154(b) by 166 days.

(21) Appl. No.: 17/440,343

(22) PCT Filed: Mar. 30, 2020

(86) PCT No.: PCT/JP2020/014656
§ 371 (c)(1),
(2) Date: Sep. 17, 2021

(87) PCT Pub. No.: WO2020/203994
PCT Pub. Date: Oct. 8, 2020

(65) Prior Publication Data
US 2022/0184549 A1    Jun. 16, 2022

(30) Foreign Application Priority Data
Mar. 29, 2019 (JP) .................. 2019-068933

(51) Int. Cl.
B01D 53/22 (2006.01)
B01D 69/08 (2006.01)
(Continued)

(52) U.S. Cl.
CPC .......... B01D 53/226 (2013.01); B01D 69/08 (2013.01); B01D 71/64 (2013.01); C10L 3/104 (2013.01);
(Continued)

(58) Field of Classification Search
None
See application file for complete search history.

(56) References Cited

U.S. PATENT DOCUMENTS 5,482,539 A      1/1996  Callahan
2010/0186586 A1*  7/2010  Chinn ................. B01D 53/226
                                                          96/10
(Continued)

FOREIGN PATENT DOCUMENTS

JP    2001-000949    1/2001
JP    2013-534863    9/2013
(Continued)

OTHER PUBLICATIONS

Deng, Liyuan et al., "Techno-economic evaluation of biogas upgrading process using CO2 facilitated transport membrane", International Journal of Greenhouse Gas Control, 4, 2010, pp. 638-646. (Year: 2010).*

(Continued)

Primary Examiner — Jason M Greene
(74) Attorney, Agent, or Firm — NIXON & VANDERHYE (57) ABSTRACT A gas separation system includes: a first gas separation membrane unit; a second gas separation membrane unit; a material gas feed line connected to a gas inlet port of the unit; a first compressor interposed to the line; a first connection line connecting a permeated gas discharge port of the unit and a gas inlet port of the unit; and a second connection line connecting a non-permeated gas discharge port of the unit and the line. The unit and unit each have a gas separation selectivity of 30 or greater. The $CH_4$ recovery rate is 98% or higher. The $CO_2$ content in non-permeated gas of the unit is 5 mol % or less. The flow rate of gas fed to the unit is 60% or less of the flow rate of material gas fed to the unit.

17 Claims, 2 Drawing Sheets (51) Int. Cl.
  *B01D 71/64* (2006.01)
  *C10L 3/10* (2006.01)
(52) U.S. Cl.
  CPC .. *B01D 2053/224* (2013.01); *C10L 2290/548* (2013.01)

(56) References Cited

U.S. PATENT DOCUMENTS

| | | | |
|---|---|---|---|
| 2015/0273388 A1 | 10/2015 | Fukuda et al. | |
| 2018/0133643 A1† | 5/2018 | Ho et al. | |
| 2018/0140994 A1* | 5/2018 | Yeo | B01D 53/226 |
| 2018/0339264 A1 | 11/2018 | Fukuda et al. | |
| 2019/0224617 A1* | 7/2019 | Mitariten | B01D 53/226 |

FOREIGN PATENT DOCUMENTS

| | | |
|---|---|---|
| JP | 2015-066484 | 4/2015 |
| JP | 2016163868 A | 9/2016 |
| JP | 2018-126729 | 8/2018 |
| JP | 2018171596 A | 11/2018 |

OTHER PUBLICATIONS

International Search Report for PCT/JP2020/014656 dated Jun. 9, 2020, 4 pages.
Written Opinion of the ISA for PCT/JP2020/014656 dated Jun. 9, 2020, 3 pages.
Deng M, Haag MB (2010) Techno-economic evaluation of biogas upgrading process using CO2 facilitated transport membrane. Intl. J. of Greenhouse Gas Control 4:638-646.†

\* cited by examiner
† cited by third party

GAS SEPARATION SYSTEM

This application is the U.S. national phase of International Application No. PCT/JP2020/014656 filed Mar. 30, 2020 which designated the U.S. and claims priority to JP Patent Application No. 2019-068933 filed Mar. 29, 2019, the entire contents of each of which are hereby incorporated by reference.

TECHNICAL FIELD

The present invention relates to a gas separation system for producing a $CH_4$ enriched gas from a material gas containing carbon dioxide ($CO_2$) and methane ($CH_4$) by using a plurality of gas separation membrane units.

BACKGROUND ART

A known method for separating a material gas containing $CO_2$ and $CH_4$ into respective gases includes the membrane separation method, which employs the difference in permeation rate of these gases against a membrane. With this method, a highly-pure $CH_4$ enriched gas, which is the target gas, can be obtained typically by recovering the non-permeated gas. The permeation rate—which is the volume of permeation of each of $CO_2$ and $CH_4$ contained in the material gas through the membrane per unit membrane area, unit time and unit partial pressure difference—can be expressed respectively as $P'_{CO2}$ and $P'_{CH4}$ (unit: $\times 10^{-5}$ $cm^3$ $(STP)/(cm^2 \cdot sec \cdot cmHg)$). The membrane's gas separation selectivity with respect to $CO_2$ and $CH_4$ can be expressed as $P'_{CO2}/P'_{CH4}$, which is the ratio between the respective permeation rates of these gases (i.e., high-permeability gas's permeation rate/low-permeability gas's permeation rate).

A gas separation membrane is typically employed in the form of a gas separation membrane module, wherein the gas separation membrane having gas permselectivity is housed inside a container having at least a gas inlet port, a permeated gas discharge port, and a non-permeated gas discharge port. The gas separation membrane is installed inside the container in a manner so as to separate the space on the gas feed side and the space on the gas permeation side. In a gas separation system, typically, a plurality of such gas separation membrane modules are combined in parallel and used as a gas separation membrane unit, in order to attain a required membrane area. The plurality of gas separation membrane modules constituting the gas separation membrane unit share the gas inlet port, the non-permeated gas discharge port, and the permeated gas discharge port; thus, the gas separation membrane unit acts substantially as a single gas separation membrane module having a large membrane area.

Figure 3:
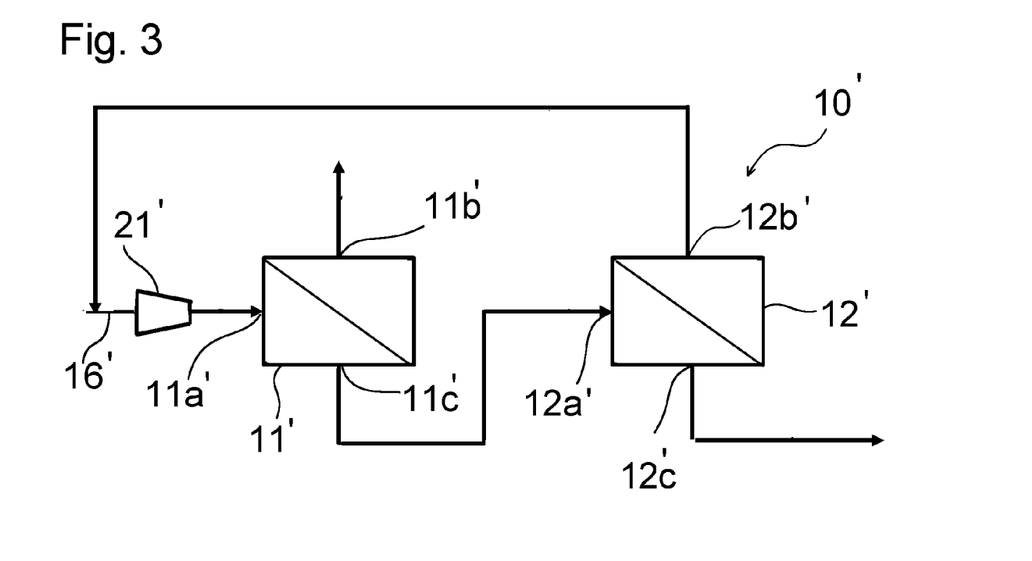
FIG. 3 is a schematic diagram illustrating a configuration of a conventional gas separation system for separating methane.

In order to recover the target product $CH_4$ with high purity and a high recovery rate, a conventional technique employs a two-stage separation system 10', as illustrated for example in FIG. 3, for a method employing a gas separation system including multiple stages of the aforementioned gas separation membrane units. The system 10' illustrated in FIG. 3 is a gas separation system having two gas separation membrane units 11', 12'. In this gas separation system 10', a material gas mixture is first fed to the first gas separation membrane unit 11'. Then, non-permeated gas from the first gas separation membrane unit 11' is fed to the second gas separation membrane unit 12'. Finally, non-permeated gas from the second gas separation membrane unit 12' is recovered as product gas. Permeated gas from the second gas separation membrane unit 12' merges with the material gas and is again fed to the first gas separation membrane unit 11'.

In applications that collect permeate gas as the product gas instead of separating $CH_4$, a two-stage gas separation system has been proposed that separates, in a secondary stage, permeate gas of a primary gas separation membrane unit (see Patent Literature 1).

CITATION LIST

Patent Literature

Patent Literature 1: U.S. Pat. No. 5,482,539A

SUMMARY OF INVENTION

In the gas separation system 10' of FIG. 3 which feeds non-permeated gas to the second stage, if an attempt is made to reduce the $CO_2$ concentration in the $CH_4$ enriched gas (product gas) while increasing the $CH_4$ recovery rate, then there will be an increase in the proportion of the gas flow rate returning from the second gas separation membrane unit 12' (i.e., the flow rate of permeated gas from the second gas separation membrane unit 12') with respect to the material gas flow rate. This will result in an increase in gas flow rate of the entire system 10', thus requiring an increase in compression power of the entire system 10'. If, on the other hand, an attempt is made to reduce the proportion of the permeated gas flow rate from the second gas separation membrane unit 12' with respect to the material gas flow rate, then there will be a need to increase the membrane area of both the first gas separation membrane unit 11' and the second gas separation membrane unit 12'. So, in the conventional gas separation system 10' for separating $CH_4$ as illustrated in FIG. 3, if the membrane area is to be reduced, there will be a need to increase compression power; thus, it has conventionally been difficult to achieve both suppression of compression power and reduction of membrane area.

An objective of the present invention is to provide a gas separation system capable of overcoming the drawbacks of the aforementioned conventional art.

The present invention provides a gas separation system to be used to produce a $CH_4$ enriched gas from a material gas containing $CO_2$ and $CH_4$, the gas separation system including:
  a first gas separation membrane unit; and
  a second gas separation membrane unit, wherein:
  each gas separation membrane unit includes at least a gas inlet port, a permeated gas discharge port, and a non-permeated gas discharge port;
  the gas separation system includes
    a material gas feed line connected to the gas inlet port of the first gas separation membrane unit,
    a compression means interposed to the material gas feed line,
    a first connection line connecting the permeated gas discharge port of the first gas separation membrane unit and the gas inlet port of the second gas separation membrane unit, and
    a second connection line connecting the non-permeated gas discharge port of the second gas separation membrane unit and the material gas feed line;
  the first gas separation membrane unit and the second gas separation membrane unit each have a gas separation selectivity $P'_{CO2}/P'_{CH4}$ of 30 or greater; and
  a recovery rate of $CH_4$ is 98% or higher; $CO_2$ content in non-permeated gas discharged from the non-permeated gas discharge port of the first gas separation membrane unit is 5 mol % or less; and an amount of gas fed to the second gas separation membrane unit per unit time is 60% or less of an amount of the material gas fed to the first gas separation membrane unit per unit time.

The present invention also provides a method for producing a $CH_4$ enriched gas from a material gas containing $CO_2$ and $CH_4$ by using a gas separation system, the method involving:

using, as the gas separation system, a gas separation system including a first gas separation membrane unit and a second gas separation membrane unit, wherein:
 each gas separation membrane unit includes at least a gas inlet port, a permeated gas discharge port, and a non-permeated gas discharge port;
 the gas separation system includes
  a material gas feed line connected to the gas inlet port of the first gas separation membrane unit,
  a compression means interposed to the material gas feed line,
  a first connection line connecting the permeated gas discharge port of the first gas separation membrane unit and the gas inlet port of the second gas separation membrane unit, and
  a second connection line connecting the non-permeated gas discharge port of the second gas separation membrane unit and the material gas feed line; and
 the first gas separation membrane unit and the second gas separation membrane unit each have a gas separation selectivity $P'_{CO2}/P'_{CH4}$ of 30 or greater; and
operating the gas separation system such that: a recovery rate of $CH_4$ is 98% or higher; $CO_2$ content in non-permeated gas discharged from the non-permeated gas discharge port of the first gas separation membrane unit is 5 mol % or less; and an amount of permeated gas discharged from the first gas separation membrane unit per unit time is 60% or less of an amount of the material gas fed to the first gas separation membrane unit per unit time.

DESCRIPTION OF EMBODIMENTS

Figure 1:
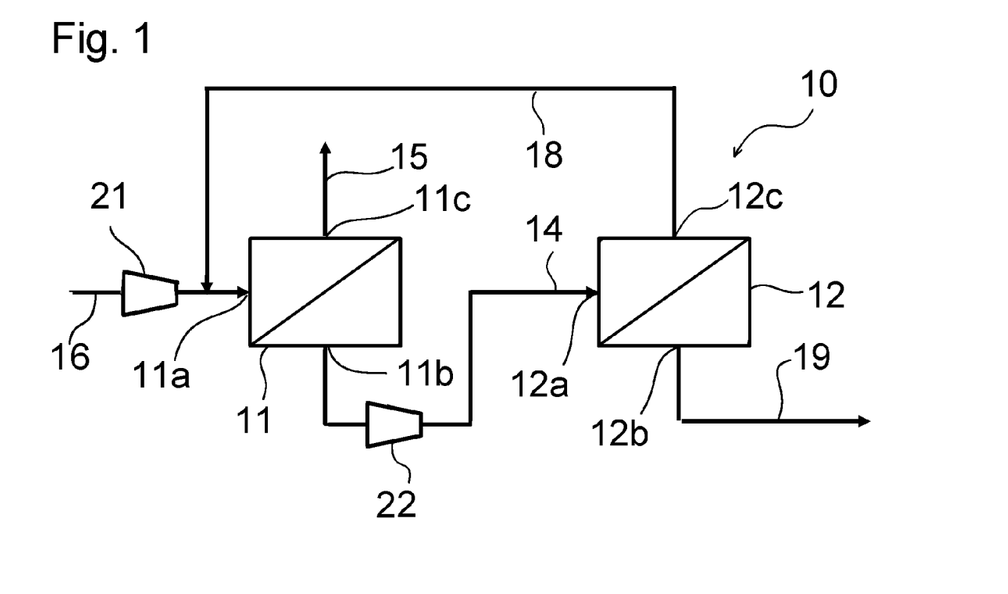
FIG. 1 is a schematic diagram illustrating a configuration of a gas separation system for separating methane according to an embodiment of the present invention.
Figure 2:
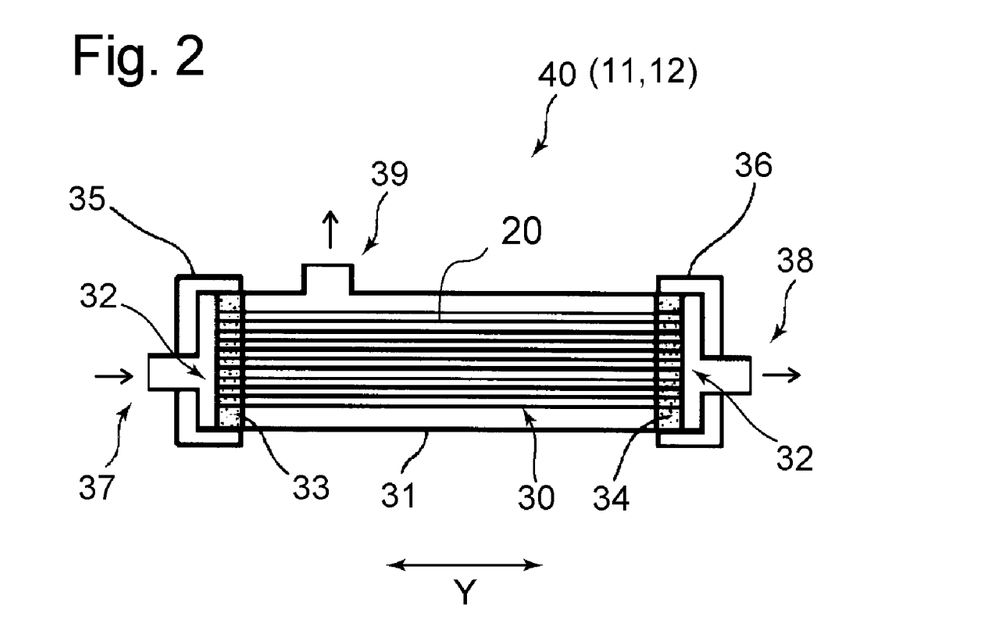
FIG. 2 is a schematic diagram illustrating a structure of an example of a module constituting a gas separation membrane unit used in a gas separation system of the present invention.

The present invention will be described below according to preferred embodiments thereof with reference to the drawings. First, a gas separation system 10 according to a preferred embodiment of the invention and a preferred embodiment of the invention for producing a $CH_4$ enriched gas by using the gas separation system will be described with reference to FIGS. 1 and 2. As illustrated in FIG. 1, the gas separation system 10 of the present embodiment includes two gas separation membrane units, i.e., a first gas separation membrane unit 11 and a second gas separation membrane unit 12. For each gas separation membrane unit 11, 12, it is possible to use, for example as illustrated in FIG. 2, a module 40 including: a gas-permselective gas separation membrane 30 constituted by, for example, hollow-fiber membranes; and a casing 31 that houses the gas separation membrane. The respective gas separation membrane in each gas separation membrane unit 11, 12 has a higher $CO_2$ permeation rate $P'_{CO2}$ ($cm^3$ (STP)/($cm^2$·sec·cmHg)) than $CH_4$ permeation rate $P'_{CH4}$ ($cm^3$ (STP)/($cm^2$·sec·cmHg)).

Each gas separation membrane unit 11, 12 in this embodiment employs a single gas separation membrane module 40 as illustrated in FIG. 2, or employs a module set in which a plurality of modules 40 are arranged in parallel. The two opposing surfaces of the casing 31 in each module 40 are open, and form openings 32. It should be noted that these openings 32 are for inserting the gas separation membrane 30 into the casing 31, and are not the openings of the gas separation membrane 30. The gas separation membrane 30 is housed inside the casing 31 through the opening 32. In cases where the gas separation membrane 30 is constituted by a hollow-fiber membrane bundle wherein a multitude of hollow-fiber membranes are bundled such that their longitudinal direction is aligned, the gas separation membrane 30 is housed inside the casing 31 such that, in a state where the membrane is housed inside the casing 31, the respective ends of the hollow-fiber membranes are opened in the vicinity of the respective openings 32 of the casing 31.

In a state where the gas separation membrane 30 is housed inside the casing 31, the gas separation membrane 30 is fixed to the inner wall of the casing 31 by tube sheets 33, 34 at positions at respective ends in the Y direction, which is the direction in which the hollow-fiber membranes extend. The openings 32 of the casing 31 are closed by respective lids 35, 36. The lid 35 is provided with a gas inlet port 37. The lid 36 is provided with a non-permeated gas discharge port 38. The gas mixture to be separated is introduced into the module (i.e., into the unit) from the gas inlet port 37 of the lid 35. Of the introduced gases, gas that has permeated the gas separation membrane 30 is discharged to outside the module (i.e., to outside the unit) from a permeated gas discharge port 39 provided in the casing 31. On the other hand, non-permeated gas that did not permeate the gas separation membrane 30 is discharged to outside the module (i.e., to outside the unit) from the non-permeated gas discharge port 38 in the lid 36. In some cases, a purge gas feed port (not illustrated) may be provided in the casing 31. Although the above explanation is based on the separation membrane module illustrated in FIG. 2, it goes without saying that the present invention is applicable to separation membrane modules with other configurations; for example, the invention is applicable to shell-feed-type modules and spiral modules.

Returning to FIG. 1, the first gas separation membrane unit 11 and the second gas separation membrane unit 12 are connected in series, as illustrated in FIG. 1. More specifically, the first gas separation membrane unit 11 and the second gas separation membrane unit 12 are connected by connecting a permeated gas discharge port 11b of the first gas separation membrane unit 11 and a gas inlet port 12a of the second gas separation membrane unit 12 by a first connection line 14.

A material gas feed line 16 for feeding a material gas, which is the material fed from a gas mixture source (not illustrated), to the first gas separation membrane unit 11 is connected to a gas inlet port 11a of the first gas separation membrane unit 11. On the other hand, a second connection line 18 for feeding non-permeated gas of the second gas separation membrane unit 12 to the first gas separation membrane unit 11 is connected to a non-permeated gas discharge port 12c of the second gas separation membrane unit 12. The second connection line 18 may be connected to either the emission side or the intake side of a first compression means 21 in the material gas feed line 16, but from the viewpoint of suppressing the required compression power of the system, it is preferable to connect the second connection line to the emission side.

The first compression means 21 is interposed in midstream of the material gas feed line 16. The first compression means 21 is provided with the aim of pressurizing the material gas and feeding the gas to the first gas separation membrane unit 11. Note, however, that in cases where the gas separation system is employed for separating pressurized gas which is, for example, fed as material gas from an oil field, separation of the material gas can be performed, even without providing the material gas feed line 16 with the first compression means 21 for pressurizing the material gas to be fed to the first gas separation membrane unit 11.

Further, a second compression means 22 is interposed in midstream of the first connection line 14. The second means 22 is provided with the aim of pressurizing permeated gas discharged from the permeated gas discharge port 11b of the first gas separation membrane unit 11, and feeding the permeated gas to the second gas separation membrane unit 12. A compressor can be used for each of the first compression means 21 and the second compression means 22.

The system 10 includes: a first extraction line 15 that is connected to a non-permeated gas discharge port 11c of the first gas separation membrane unit 11 and that is used to extract non-permeated gas to outside the system from the discharge port 11c; and a second extraction line 19 that is connected to a permeated gas discharge port 12b of the second gas separation membrane unit 12 and that is used to extract permeated gas to outside the system from the discharge port 12b.

The operation of the gas separation system 10 of the present embodiment configured as above will be described below. A material gas to be separated is fed from a gas mixture source (not illustrated) to the first gas separation membrane unit 11 through the material gas feed line 16.

The material gas contains at least $CO_2$ and $CH_4$ which are to be separated. When the material gas, in a pressurized state, is fed to the first gas separation membrane unit 11, the gas mixture is separated into permeated gas, which is gas that has permeated through the gas separation membrane, and non-permeated gas, which is gas that did not permeate through the gas separation membrane, due to a difference in permeation rate against the gas separation membrane. As described above, the gas separation membrane in both the first gas separation membrane unit 11 and the second gas separation membrane unit 12 has a higher $CO_2$ permeation rate $P'_{CO2}$ than the $CH_4$ permeation rate $P'_{CH4}$. In the non-permeated gas discharged from the non-permeated gas discharge port 11c of the first gas separation membrane unit 11, $CH_4$ is more concentrated compared to the material gas. The non-permeated gas is discharged from the non-permeated gas discharge port 11c, and is extracted to outside the system through the first extraction gas line 15. On the other hand, in the permeated gas from the first gas separation membrane unit 11, $CO_2$ is more concentrated compared to the material gas. The permeated gas is discharged from the permeated gas discharge port 11b and is fed to the second gas separation membrane unit 12 through the first connection line 14. Further, gas in which carbon dioxide has been further concentrated is extracted to outside the system from the permeated gas discharge port 12b of the second gas separation membrane unit 12. The non-permeated gas of the second gas separation membrane unit 12 is introduced to the material gas feed line 16 through the second connection line 18 from the non-permeated gas discharge port 12c and merges with the material gas, and is again fed to the first gas separation membrane unit 11.

In the gas separation system 10 of the present embodiment, the $CO_2$ content in the non-permeated gas discharged from the non-permeated gas discharge port 11c of the first gas separation membrane unit 11 is 5 mol % or less. To further increase the purity of $CH_4$ in the non-permeated gas, it is particularly preferable that the $CO_2$ content in the non-permeated gas is 3 mol % or less. The purity of $CH_4$ in the non-permeated gas is preferably 95 mol % or higher, more preferably 97 mol % or higher.

Further, in the present embodiment, the recovery rate of $CH_4$ is 98% or higher, particularly preferably 98.5% or higher. The recovery rate of $CH_4$ is calculated as the amount of $CH_4$ in the non-permeated gas discharged per unit time from the first gas separation membrane unit 11's non-permeated gas discharge port 11c with respect to the amount, per unit time, of $CH_4$ in the material gas introduced to the first gas separation membrane unit 11. The recovery rate is the percentage based on volume under standard conditions. Increasing the $CH_4$ recovery rate is preferable also from the viewpoint of preventing global warming by reducing the amount of $CH_4$, a greenhouse-effect gas, that is discharged to outside the system. From the viewpoint of membrane area and energy consumption, a lower recovery rate is preferred; however, to suppress loss of $CH_4$ gas, a high recovery rate is desired.

In the present embodiment, the ratio (referred to hereinafter as "feed flow rate ratio (F2/F1)") of the flow rate (F2) (amount of gas per unit time; unit: $Nm^3/h$) of gas fed to the second gas separation membrane unit 12 to the flow rate (F1) of gas fed to the first gas separation membrane unit 11 is set to 60% or less. In this way, in the system 10 of the present embodiment, the feed flow rate of the second gas separation membrane unit 12 is set to a given level or lower. This makes it possible to suppress the entire system's flow rate, which is dependent on the aforementioned flow rate, and thus suppress the entire system's compression power, which is dependent on the aforementioned flow rate. Particularly, in cases of using the second compression means 22, which is interposed in midstream of the first connection line 14 as in the present embodiment, it is possible to significantly reduce the compression power of the second compression means 22. From the viewpoint of further suppressing the required compression power of the system, the feed flow rate ratio (F2/F1) is more preferably 50% or less. The lower the feed flow rate ratio (F2/F1), the better, but typically, the ratio is 10% or higher, or 20% or higher.

A feature of the present embodiment is that the gas separation selectivity $P'_{CO2}/P'_{CH4}$ of each of the first gas separation membrane unit 11 and the second gas separation membrane unit 12 is set to a specific value. More specifically, the gas separation selectivity $(P'_{CO2}/P'_{CH4})^1$ of the first gas separation membrane unit 11, as well as the gas separation selectivity $(P'_{CO2}/P'_{CH4})^2$ of the second gas separation membrane unit 12, is 30 or greater. With this configuration, the compression power of the second compression means 22 can be reduced, which is advantageous in that it is possible to achieve both reduction of membrane area and suppression of compression power while reducing the amount of $CO_2$ gas in the product gas. The gas separation selectivity $(P'_{CO2}/P'_{CH4})^1$ of the first gas separation membrane unit 11, as well as the gas separation selectivity $(P'_{CO2}/P'_{CH4})^2$ of the second gas separation membrane unit 12, is more preferably 35 or greater. From the viewpoint of easy manufacturability of the gas separation membrane unit, it is preferable that the gas separation selectivity $(P'_{CO2}/P'_{CH4})^1$ of the first gas separation membrane unit 11, as well as the gas separation selectivity $(P'_{CO2}/P'_{CH4})^2$ of the second gas separation membrane unit 12, is typically 120 or less.

It is preferable that the ratio S1/S2 of the membrane area S1 of the first gas separation membrane unit 11 to the membrane area S2 of the second gas separation membrane unit is from 1 to 14, more preferably from 2 to 12, as this allows F2/F1 to fall within the aforementioned range easily.

In the present embodiment, the gas separation selectivity $(P'_{CO2}/P'_{CH4})^1$ of the first gas separation membrane unit 11 and the gas separation selectivity $(P'_{CO2}/P'_{CH4})^2$ of the second gas separation membrane unit 12, which are the two constituent units, may be the same or different from one another. Also, the $CO_2$ permeation rate $P'_{CO2}{}^1$ of the first gas separation membrane unit 11 and the $CO_2$ permeation rate $P'_{CH4}{}^2$ of the second gas separation membrane unit 12 may be the same or different from one another.

On the other hand, it is preferable that the $CO_2$ permeation rate $P'_{CO2}{}^1$ of the first gas separation membrane unit is higher than the $CO_2$ permeation rate $P'_{CO2}{}^2$ of the gas separation membrane used in the second gas separation membrane unit, in terms that the number of membrane modules can be reduced without greatly impairing the efficiency of the entire system.

In cases where the $CO_2$ permeation rate $P'_{CO2}{}^1$ of the first gas separation membrane unit is higher than the $CO_2$ permeation rate $P'_{CO2}{}^2$ of the gas separation membrane used in the second gas separation membrane unit, it is preferable that, from the aforementioned viewpoint, the ratio $P'_{CO2}{}^2/P'_{CO2}{}^1$ between the permeation rates of the two units is 0.7 or less, more preferably 0.5 or less.

It will suffice if the aforementioned gas separation selectivity $P'_{CO2}/P'_{CH4}$ ($P'_{CO2}/P'_{CH4}{}^1$ and $P'_{CO2}/P'_{CH4}{}^2$) and $CO_2$ permeation rate $P'_{CO2}$ ($P'_{CO2}{}^1$ and $P'_{CO2}{}^2$) are the gas separation selectivity $P'_{CO2}/P'_{CH4}$ and $CO_2$ permeation rate $P'_{CO2}$ under temperature conditions of the respective gas separation membrane units during operation.

An example of a method for making the gas permeation rate and/or gas separation selectivity different between the two units during operation is to use different types of gas separation membranes for the two units. In order to make the types of gas separation membranes different between the units, the units may use: (1) separation membranes having different chemical compositions; (2) separation membranes that have the same chemical composition, but for which the production conditions (e.g., conditions for producing the membrane, the heat treatment temperature, etc.) are different; or (3) separation membranes that have the same chemical composition and production conditions, but for which the conditions for surface treatment, such as coating, are different.

It is generally known that, even if the same gas separation membrane is used, setting the operation temperature relatively low will reduce the gas permeation rate, compared to cases where the operation temperature is set relatively high.

Based on this fact, the aforementioned relationship between the two units' permeation rates may be achieved by differentiating the operation temperatures of the respective units. For example, the $P'_{CO2}{}^2$ of the second gas separation membrane unit 12 may be made higher than the $CO_2$ permeation rate $P'_{CO2}{}^1$ of the first gas separation membrane unit 11 by making the operation temperature of the second gas separation membrane unit 12 higher than that of the first gas separation membrane unit 11. Alternatively, the $P'_{CO2}{}^1$ of the first gas separation membrane unit 11 may be made higher than the $CO_2$ permeation rate $P'_{CO2}{}^2$ of the second gas separation membrane unit 12 by making the operation temperature of the first gas separation membrane unit 11 higher than that of the second gas separation membrane unit 12. In cases of differentiating the two units' operation temperatures, it is preferable that the difference in operation temperature is 5° C. or greater, more preferably 20° C. or greater, even more preferably 40° C. or greater.

Note that the operation temperature of the first gas separation membrane unit 11 and the second gas separation membrane unit is not particularly limited, and may be, for example, between room temperature and 80° C.

The ratio $(P'_{CO2}/P'_{CH4})^1/(P'_{CO2}/P'_{CH4})^2$ between the first gas separation membrane unit 11's gas separation selectivity $(P'_{CO2}/P'_{0})_4)^1$ and the second gas separation membrane unit 12's gas separation selectivity $(P'_{CO2}/P'_{CH4})^2$ may be, for example, preferably from 0.2 to 1.1, more preferably from 0.2 to 1, in order to increase the $CH_4$ recovery rate while suppressing the number of modules.

The ratio between $CH_4$ and $CO_2$ in the material gas is not particularly limited, but the gas separation system and gas separation method of the present invention can be used, for example, for separating a material gas containing approximately from 40 to 80 vol % of $CH_4$, or approximately from 20 to 60 vol % of $CO_2$, with respect to 100 vol % in total of $CH_4$ and $CO_2$. As regards carbon dioxide ($CO_2$) and methane ($CH_4$) in the material gas, the volume percentage of carbon dioxide ($CO_2$) may be greater than that of methane ($CH_4$), or the volume percentage of carbon dioxide ($CO_2$) may be smaller than that of methane ($CH_4$). It is preferable that the total percentage of $CH_4$ and $CO_2$ in the material gas is 95 vol % or greater, more preferably 98 vol % or greater. An example of such a material gas includes biogas. Biogas is a gas produced by methane fermentation of organic waste by the action of anaerobic microorganisms. Examples of biogas may include digester gas produced by anaerobic fermentation of sewage sludge, and landfill gas produced at a landfill site. Examples of the aforementioned organic waste may include the aforementioned sewage sludge and landfill waste, as well as urine/feces of cows, pigs, etc., and food waste. The material gas may preferably be natural gas, as the gas separation system of the present invention can be suitably used therefor.

The gas separation membrane to be used in each gas separation membrane unit 11, 12 may be selected as appropriate depending on the gas mixture being fed and/or the type of target product gas. Membranes conventionally used in this technical field can be used for the gas separation membranes without particular limitation. Examples of membrane materials include: rubber-state polymer materials, such as silicone resins and polybutadiene resins; glass-state polymer materials, such as polyimides, polyether imides, polyamides, polyamide imides, polysulfones, polycarbonates, and cellulose; and ceramic materials such as zeolite. The gas separation membrane may be, for example, a homogeneous membrane, an asymmetric membrane including a homogenous layer and a porous layer, or a microporous membrane. The gas separation membrane may be housed in the casing in various forms, such as in a plate-and-frame form, spiral form, or hollow-fiber form. An example of a preferable gas separation membrane is an aromatic polyimide hollow-fiber gas separation membrane. It is preferable that the hollow-fiber gas separation membrane has an asymmetric structure in which the thickness of the homogenous layer is from 10 nm to 200 nm and the thickness of the porous layer is from 20 μm to 200 μm. It is preferable that the hollow-fiber membrane has an inner diameter of approximately from 30 μm to 500 μm.

A single gas separation membrane unit may have one gas separation membrane module, or may have a plurality of gas separation membrane modules. In cases where a single gas separation membrane unit includes two or more gas separation membrane modules, it is preferable that the modules are connected in parallel within the unit. By providing a plurality of gas separation membrane modules in each gas separation membrane unit, it is possible to easily adjust the membrane area of each unit by changing the number of gas separation membrane modules.

Further, from the viewpoint of energy efficiency etc., it is preferable that, typically, the pressure of gas to be fed to the first gas separation membrane unit 11 and the second gas separation membrane unit 12, which are constituted by hollow-fiber membranes, is from 0.2 MPaG to 2.0 MPaG, and more preferably, the pressure of gas to be fed to the second gas separation membrane unit 12 is slightly (about 0 to 0.3 MPaG) higher than the pressure of gas to be fed to the first gas separation membrane unit 11.

The present invention has been described above according to preferred embodiments thereof, but the present invention is not limited to the foregoing embodiments. For example, in the foregoing embodiment, the second compression means 22 was interposed to the first connection line 14, but instead of, or in addition to, providing the second compression means 22, it is also preferable to set the permeation-side space of the second gas separation membrane unit 12 to a pressure equal to or below atmospheric pressure with a vacuum pump etc., in terms that compression power can be further reduced.

Further, in the foregoing embodiment, gas separation membrane units including hollow-fiber membranes were employed as an example of the gas separation membrane units, but other types of gas separation membrane units may be employed instead.

EXAMPLES

The present invention is described in further detail below according to Examples thereof. The scope of the present invention, however, is not limited to these Examples.

Examples 1-1 to 1-5

A gas mixture containing carbon dioxide and methane was separated by using the gas separation system 10 illustrated in FIG. 1. A compressor was used for the first compression means 21 in the system 10. The gas mixture used had a composition of 40 vol % $CO_2$ and 60 vol % $CH_4$. Each of the first and second gas separation membrane units 11, 12 was constituted by a plurality of modules connected in parallel, each module being constituted by a gas separation membrane module that houses, in a casing, a gas separation membrane constituted by polyimide hollow-fiber membranes and having $P'_{CO2}$ of $9.62 \times 10^{-5}$ $cm^3$ (STP)/($cm^2 \cdot sec \cdot cmHg$), $P'_{CH4}$ of $0.16 \times 10^{-5}$ $cm^3$ (STP)/($cm^2 \cdot sec \cdot cmHg$), and a gas separation selectivity $P'_{CO2}/P'_{CH4}$ of 61.91. The operation temperature of the first and second gas separation membrane units 11, 12 was 35° C.

The number of gas separation membrane modules constituting the first gas separation membrane unit 11 was set to 70. The number of gas separation membrane modules constituting the second gas separation membrane unit 12 was set to the respective values shown in Table 1. The gas mixture was fed to the first gas separation membrane unit 11 at a flow rate of 500 $Nm^3/h$ under a pressure of 1 MPaG. The permeated gas of the first gas separation membrane unit 11 was fed to the second gas separation membrane unit 12 under a pressure of 1.1 MPaG. The non-permeated gas of the second gas separation membrane unit 12 was returned to the first gas separation membrane unit 11. The pressure of the permeated gas at the permeated gas discharge port of the first gas separation membrane unit 11, as well as the pressure of the permeated gas at the permeated gas discharge port of the second gas separation membrane unit 12, was 0.03 MPaG. Table 1 shows the feed flow rates to the respective units under the aforementioned conditions. Table 1 also shows the composition of the non-permeated gas of the first gas separation membrane unit 11, the $CH_4$ recovery rate (Rcv.; %), the flow rates of permeated gas and non-permeated gas of each unit, the feed flow rate ratio (F2/F1), the compression power of the second compression means 22, and the total compression power (the sum of the compression powers of the compression means 21, 22).

Examples 2-1 to 2-5

The configuration was the same as in Example 1-1, except that the number of gas separation membrane modules constituting the first gas separation membrane unit 11 was set to 80, and the number of gas separation membrane modules constituting the second gas separation membrane unit 12 was set to the respective values shown in Table 1. Table 1 shows the feed flow rates to the respective units. Table 1 also shows the composition of the non-permeated gas of the first gas separation membrane unit 11, the $CH_4$ recovery rate (Rcv.; %), the flow rates of permeated gas and non-permeated gas of each unit, the feed flow rate ratio (F2/F1), the compression power of the second compression means 22, and the total compression power.

Examples 3-1 to 3-6

Each of the first gas separation membrane unit 11 and the second gas separation membrane unit 12 was constituted by a plurality of modules connected in parallel, each module being constituted by a gas separation membrane module that houses, in a casing, a gas separation membrane constituted by polyimide hollow-fiber membranes and having $P'_{CO2}$ of $8.49 \times 10^{-5}$ $cm^3$ (STP)/($cm^2 \cdot sec \cdot cmHg$), $P'_{CH4}$ of $0.16 \times 10^{-5}$ $cm^3$ (STP)/($cm^2 \cdot sec \cdot cmHg$), and a gas separation selectivity $P'_{CO2}/P'_{CH4}$ of 54.63. Other than the above, the configuration was the same as in Example 2-1. Table 1 shows the composition of the non-permeated gas of the first gas separation membrane unit 11, the $CH_4$ recovery rate (Rcv.; %), the flow rates of permeated gas and non-permeated gas of each unit, the feed flow rate ratio (F2/F1), the compression power of the second compression means 22, and the total compression power.

Comparative Examples 1-1 to 1-5, 2-1 to 2-5, 3-1 to 3-6, 4-1 to 4-4, and 5-1 to 5-2

Each of the first gas separation membrane unit 11 and the second gas separation membrane unit 12 was constituted by a plurality of modules connected in parallel, each module being constituted by a gas separation membrane module that houses, in a casing, a gas separation membrane constituted by polyimide hollow-fiber membranes and having $P'_{CO2}$ of $4.51 \times 10^{-5}$ $cm^3$ (STP)/($cm^2 \cdot sec \cdot cmHg$), $P'_{CH4}$ of $0.16 \times 10^{-5}$ $cm^3$ (STP)/($cm^2 \cdot sec \cdot cmHg$), and a gas separation selectivity $P'_{CO2}/P'_{CH4}$ of 29.00. The number of gas separation membrane modules in each of the first gas separation membrane unit 11 and the second gas separation membrane unit 12 was set to the number shown in Table 2. Other than the above, the configuration was the same as in Example 1-1. Table 2 shows the feed flow rates to the respective units. Table 2 also shows the composition of the non-permeated gas of the first gas separation membrane unit 11, the $CH_4$ recovery rate (Rcv.; %), the flow rates of permeated gas and non-permeated gas of each unit, the feed flow rate ratio (F2/F1), the compression power of the second compression means 22, and the total compression power.

Comparative Examples 6-1 to 6-5

A gas separation system 10' as illustrated in FIG. 3 was used. Each of the first and second gas separation membrane units 11', 12' was constituted by a plurality of modules connected in parallel, each module being constituted by a gas separation membrane module that houses, in a casing, a gas separation membrane constituted by polyimide hollow-fiber membranes and having $P'_{CO2}$ of $9.62 \times 10^{-5}$ cm$^3$ (STP)/(cm$^2$·sec·cmHg), $P'_{CH4}$ of $0.16 \times 10^{-5}$ cm$^3$ (STP)/(cm$^2$·sec·cmHg), and a gas separation selectivity $P'_{CO2}/P'_{CH4}$ of 61.91. The number of gas separation membrane modules constituting the first gas separation membrane unit 11' was set to the respective values shown in Table 3. The number of gas separation membrane modules constituting the second gas separation membrane unit 12' was set to 70. The gas mixture was fed to the first gas separation membrane unit 11' at a flow rate of 500 Nm$^3$/h under a pressure of 1 MPaG. The non-permeated gas of the first gas separation membrane unit 11' was fed to the second gas separation membrane unit 12'. The permeated gas of the second gas separation membrane unit 12' was returned to the first gas separation membrane unit 11'. The pressure of the permeated gas at the permeated gas discharge port of the first gas separation membrane unit 11', as well as the pressure of the permeated gas at the permeated gas discharge port of the second gas separation membrane unit 12, was 0.03 MPaG. Table 3 shows the feed flow rates to the respective units. Table 3 also shows the composition of the non-permeated gas of the second gas separation membrane unit 12, the $CH_4$ recovery rate (Rcv.; %), the flow rates of permeated gas and non-permeated gas of each unit, and the compression power of the first compression means 21'.

Comparative Examples 7-1 to 7-5

The configuration was the same as in Comparative Example 6-1, except that the number of gas separation membrane modules constituting the first gas separation membrane unit 11' was set to 80, and the number of modules constituting the second gas separation membrane unit 12' was set to the respective values shown in Table 3. Table 3 shows the feed flow rates to the respective units. Table 3 also shows the composition of the non-permeated gas of the first gas separation membrane unit 11, the $CH_4$ recovery rate (Rcv.; %), and the compression power of the first compression means 21'.

Comparative Examples 8-1 and 8-2

Each of the first and second gas separation membrane units 11', 12' was constituted by a plurality of modules connected in parallel, each module being constituted by a gas separation membrane module that houses, in a casing, a gas separation membrane constituted by polyimide hollow-fiber membranes and having $P'_{CO2}$ of $8.49 \times 10^{-5}$ cm$^3$ (STP)/(cm$^2$·sec·cmHg), $P'_{CH4}$ of $0.16 \times 10^{-5}$ cm$^3$ (STP)/(cm$^2$·sec·cmHg), and a gas separation selectivity $P'_{CO2}/P'_{CH4}$ of 54.63. The number of modules constituting each of the first gas separation membrane unit 11' and the second gas separation membrane unit 12' was set to the respective values shown in Table 3. Other than the above, the configuration was the same as in Comparative Example 6-1. Table 3 shows the composition of the non-permeated gas of the second gas separation membrane unit 12, the $CH_4$ recovery rate (Rcv.; %), and the compression power of the first compression means 21'.

TABLE 1

| Example No. | P'CO2/P'CH4 | First unit Modules Number | Second unit Modules Number | Composition of non-permeated gas of first unit [mol%] CO2 | CH4 | CH$_4$ recovery rate Rcv.[%] | Material Nm3/h | First unit Feed (F1) Nm3/h |
|---|---|---|---|---|---|---|---|---|
| 1-1 | 61.91 | 70 | 11 | 2.86 | 97.14 | 98.39 | 500.0 | 540.4 |
| 1-2 | | 70 | 16 | 2.86 | 97.12 | 98.64 | 500.0 | 542.3 |
| 1-3 | | 70 | 9 | 2.91 | 97.09 | 98.88 | 500.0 | 5449 |
| 1-4 | | 70 | 2 | 2.95 | 97.05 | 99.12 | 500.0 | 549.7 |
| 1-5 | | 70 | 7 | 3.04 | 96.96 | 99.36 | 500,0 | 561.0 |
| 2-1 | | 80 | 11 | 2.05 | 97.95 | 98.41 | 500.0 | 548.4 |
| 2-2 | | 80 | 10 | 2.08 | 97.92 | 98.65 | 500.0 | 550 3 |
| 2-3 | | 80 | 9 | 2.19 | 97.90 | 98.89 | 500.0 | 554.5 |
| 2-4 | | 80 | 8 | 2.14 | 97.86 | 99.14 | 500.0 | 561.4 |
| 2-5 | | 80 | 7 | 2.24 | 97.76 | 99.38 | 500.0 | 577.6 |
| 3-1 | 54.63 | 80 | 13 | 2.48 | 97.52 | 98.05 | 500.0 | 546.0 |
| 3-2 | | 80 | 12 | 2.50 | 97.50 | 98.30 | 500.0 | 547.3 |
| 3-3 | | 80 | 11 | 2.53 | 97.47 | 98.54 | 500.0 | 550.2 |
| 3-4 | | 80 | 10 | 2.56 | 97.44 | 98.78 | 500.0 | 553.8 |
| 3-5 | | 80 | 9 | 2.61 | 97.39 | 99.02 | 500.0 | 560.1 |
| 3-6 | | 80 | 8 | 2.71 | 97.29 | 99.27 | 500.0 | 573.2 |

TABLE 1-continued

| | First unit | | Second unit | | | | Compression power of compression means 22 kW | Total compression power kW |
|---|---|---|---|---|---|---|---|---|
| Example No. | Permeated Nm3/h | Non-permeated Nm3/h | Feed (F2) Nm3/h | Permeated Nm3/h | Non-permeated Nm3/h | F2/F1 | | |
| 1-1 | 236.5 | 303.9 | 236.5 | 196.1 | 40.4 | 44% | 19 | 63 |
| 1-2 | 237.6 | 304.7 | 237.6 | 195.3 | 42.3 | 44% | 19 | 63 |
| 1-3 | 229.4 | 305.5 | 239.4 | 194.5 | 44.9 | 44% | 19 | 63 |
| 1-4 | 243.3 | 306.4 | 243.3 | 193.6 | 49.7 | 44% | 19 | 63 |
| 1-5 | 253.6 | 307.4 | 253.6 | 192.6 | 61.0 | 45% | 20 | 64 |
| 2-1 | 247.0 | 301.4 | 247.0 | 198.6 | 48.4 | 45% | 20 | 63 |
| 2-2 | 248.5 | 302.2 | 248.5 | 191.8 | 50.8 | 45% | 20 | 64 |
| 2-3 | 251.4 | 303.0 | 251.4 | 197.0 | 54.5 | 45% | 20 | 64 |
| 2-4 | 257.5 | 303.5 | 257.5 | 196.1 | 61.4 | 46% | 21 | 64 |
| 2-5 | 272.6 | 305.0 | 272.6 | 195.0 | 77.6 | 47% | 22 | 65 |
| 3-1 | 244.3 | 3013 | 244.3 | 198.3 | 46.0 | 45% | 20 | 63 |
| 3-2 | 245.3 | 302.5 | 245.3 | 197.5 | 47.8 | 45% | 20 | 63 |
| 3-3 | 246.9 | 393.3 | 246.9 | 196.7 | 50.2 | 45% | 20 | 63 |
| 3-4 | 249.7 | 304.1 | 249.7 | 195.9 | 53.8 | 45% | 20 | 64 |
| 3-5 | 255.1 | 305.0 | 255.1 | 195.0 | 60.1 | 46% | 20 | 64 |
| 3-6 | 267.1 | 306.1 | 267.1 | 193.9 | 73.2 | 47% | 21 | 65 |

TABLE 2

| Example No. | P'CO2/ P'CH4 | First unit Modules Number | Second unit Modules Number | Composition of non-permeated gas of first unit [mol%] | | $CH_4$ recovery rate Rev.[%] | Material Nm3/h | First unit Feed (F1) Nm3/h |
|---|---|---|---|---|---|---|---|---|
| | | | | CO2 | CH4 | | | |
| 1-1 | 29.00 | 70 | 11 | 9.73 | 90.27 | 99.30 | 500.0 | 590.1 |
| 1-2 | | 70 | 10 | 10.84 | 89.16 | 99.50 | 500.0 | 625.2 |
| 1-3 | | 70 | 9 | 12.71 | 87.29 | 99.67 | 500.0 | 681.9 |
| 1-4 | | 70 | 8 | 15.56 | 84.44 | 99.79 | 500.0 | 781.1 |
| 1-5 | | 70 | 7 | 19.13 | 80.87 | 99.87 | 500.0 | 849.4 |
| 2-1 | 29.00 | 80 | 11 | 8.48 | 91.52 | 99.36 | 500.0 | 623.9 |
| 2-2 | | 80 | 10 | 9.76 | 90.24 | 99.56 | 500.0 | 673.9 |
| 2-3 | | 80 | 9 | 11.95 | 88.05 | 99.72 | 500.0 | 753.7 |
| 2-4 | | 80 | 3 | 15.22 | 84.78 | 99.83 | 500.2 | 858.6 |
| 2-5 | | 80 | 7 | 19.12 | 80.88 | 99.89 | 500.0 | 965.3 |
| 3-1 | 29.00 | 140 | 19 | 2.06 | 97.94 | 98.40 | 500.0 | 638.8 |
| 3-2 | | 140 | 15 | 2.20 | 97.80 | 98.64 | 500.0 | 657.4 |
| 3-3 | | 140 | 14 | 2.40 | 97.60 | 98.88 | 500.0 | 683.9 |
| 3-4 | | 140 | 13 | 2.70 | 97.30 | 99.12 | 500.0 | 724.2 |
| 3-5 | | 110 | 12 | 3.22 | 96.78 | 99.35 | 500.0 | 790.5 |
| 3-6 | | 140 | 11 | 4.23 | 95.77 | 99.58 | 500.0 | 911 8 |
| 4-1 | 29.00 | 150 | 14 | 2.00 | 98,00 | 98.90 | 500.0 | 706.4 |
| 4-2 | | 150 | 13 | 2.29 | 97.71 | 99.14 | 500.0 | 752.3 |
| 4-3 | | 150 | 12 | 2.79 | 97.21 | 99.33 | 500.0 | 829.1 |
| 4-4 | | 150 | 11 | 3.83 | 96.17 | 99.61 | 500.0 | 974.7 |
| 5-1 | 29.00 | 160 | 12 | 2.41 | 97.59 | 99.40 | 500.0 | 869.2 |
| 5-2 | | 160 | 11 | 3.48 | 96.52 | 99.63 | 500.0 | 1043.0 |

| | First unit | | Second unit | | | | Compression power of compression means 22 kW | Total compression power kW |
|---|---|---|---|---|---|---|---|---|
| Example No. | Permeated Nm3/h | Non-permeated Nm3/h | Feed (F2) Nm3/h | Permeated Nm3/h | Non-permeated Nm3/h | F2/F1 | | |
| 1-1 | 290.1 | 330.0 | 260.1 | 170.0 | 90.1 | 44% | 21 | 64 |
| 1-2 | 290.4 | 334.8 | 290.4 | 165.2 | 125.2 | 46% | 23 | 67 |
| 1-3 | 339.3 | 342.5 | 339.3 | 157.5 | 181.9 | 50% | 27 | 71 |
| 1-4 | 408.6 | 354.5 | 406.6 | 145.5 | 261.1 | 55% | 33 | 76 |
| 1-5 | 478.9 | 370.5 | 478.9 | 129.5 | 3494 | 56% | 38 | 82 |
| 2-1 | 298.2 | 325.7 | 298.2 | 174.3 | 123.9 | 48% | 24 | 67 |
| 2-2 | 343.0 | 331.0 | 343.0 | 169.0 | 173.9 | 51% | 27 | 71 |
| 2-3 | 413.9 | 339.8 | 413.9 | 160.2 | 253.7 | 55% | 33 | 77 |
| 2-4 | 505.3 | 353.2 | 505.3 | 148.8 | 358.6 | 59% | 40 | 84 |
| 2-5 | 594.8 | 370.5 | 594.8 | 129.5 | 465.3 | 62% | 48 | 91 |
| 3-1 | 337.4 | 301.4 | 337.4 | 198.8 | 133.8 | 53% | 27 | 71 |
| 3-2 | 354.8 | 302.6 | 354.8 | 197.4 | 157.4 | 54% | 28 | 72 |
| 3-3 | 360.0 | 303.9 | 380.0 | 196.1 | 183.9 | 56% | 30 | 74 |
| 3-4 | 418.6 | 305.6 | 418.6 | 194.4 | 224.2 | 58% | 34 | 77 |

TABLE 2-continued

| | | | | | | | | |
|---|---|---|---|---|---|---|---|---|
| 3-5 | 482.5 | 308.0 | 482.5 | 192.0 | 290.5 | 61% | 39 | 82 |
| 3-6 | 599.9 | 311.2 | 550.9 | 188.1 | 411.8 | 66% | 48 | 92 |
| 4-1 | 403.6 | 302.8 | 403.6 | 197.2 | 206.4 | 57% | 32 | 76 |
| 4-2 | 447.9 | 304.4 | 447.9 | 195.6 | 252.3 | 60% | 36 | 79 |
| 4-3 | 522.5 | 306.7 | 522.5 | 193.3 | 329,1 | 63% | 42 | 85 |
| 4-4 | 664.0 | 310.7 | 684.0 | 189.3 | 474.7 | 68% | 53 | 97 |
| 5-1 | 563.6 | 305.6 | 563.6 | 194.4 | 369.2 | 65% | 45 | 59 |
| 5-2 | 733.3 | 309.7 | 733.3 | 190.3 | 543.0 | 70% | 59 | 102 |

TABLE 3

| Example No. | First unit $P'CO2/P'CH4$ | First unit Modules Number | Second unit Modules Number | Composition of non-permeated gas of first unit [mol%] CO2 | Composition of non-permeated gas of first unit [mol%] CH4 | $CH_4$ recovery rate Rev.[%] | Material Nm3/h |
|---|---|---|---|---|---|---|---|
| 6-1 | 61.91 | 11 | 70 | 4.76 | 95.24 | 98.71 | 500.0 |
| 6-2 | | 10 | 70 | 5.66 | 94.34 | 98.93 | 500.0 |
| 6-3 | | 9 | 70 | 7.05 | 92.95 | 99.14 | 500.0 |
| 6-4 | | 8 | 70 | 9.38 | 90.62 | 99.33 | 500.0 |
| 6-5 | | 7 | 70 | 13.22 | 86.78 | 99.49 | 500.0 |
| 7-1 | | 11 | 80 | 3.80 | 96.20 | 98.73 | 500.0 |
| 7-2 | | 10 | 80 | 4.62 | 95.38 | 98.95 | 500.0 |
| 7-3 | | 9 | 80 | 5.94 | 94.06 | 99.16 | 500.0 |
| 7-4 | | 8 | 80 | 8.28 | 91.72 | 99.36 | 500.0 |
| 7-5 | | 7 | 80 | 12.38 | 87.62 | 99.52 | 500.0 |
| 8-1 | 54.63 | 13 | 80 | 3.90 | 96.10 | 98.42 | 500.0 |
| 8-2 | | 7 | 80 | 16.35 | 83.65 | 99 55 | 500.0 |

| Example No. | First unit Feed (F1) Nm3/h | First unit Permeated Nm3/h | First unit Non-permeated Nm3/h | Second unit Feed (F2) Nm3/h | Second unit Permeated Nm3/h | Second unit Non-permeated Nm3/h | Compression power of compression means 21 kW |
|---|---|---|---|---|---|---|---|
| 6-1 | 779.5 | 189.0 | 590.5 | 590.5 | 279.5 | 311.0 | 68 |
| 6-2 | 827.4 | 185.4 | 642.0 | 642.0 | 327.4 | 314.6 | 72 |
| 6-3 | 892.3 | 180.0 | 712.3 | 712.3 | 392.3 | 320.0 | 78 |
| 6-4 | 976.8 | 171.2 | 805.6 | 805.6 | 476.8 | 328.8 | 85 |
| 6-5 | 1065.0 | 156.1 | 908.9 | 908.9 | 565.0 | 343.9 | 93 |
| 7-1 | 802.3 | 192.1 | 610.2 | 610.2 | 302.3 | 307.9 | 70 |
| 7-2 | 855.4 | 188.8 | 666.6 | 666.6 | 355.4 | 311.2 | 75 |
| 7-3 | 929.1 | 183.7 | 745.4 | 745.4 | 429.1 | 316.3 | 81 |
| 7-4 | 1028.1 | 175.0 | 853.1 | 853.1 | 528.1 | 325.0 | 90 |
| 7-5 | 1132.1 | 159.3 | 972.9 | 972.9 | 632.1 | 340.7 | 99 |
| 8-1 | 774.5 | 192.8 | 581.8 | 581.8 | 274.5 | 307.2 | 68 |
| 8-2 | 1159.5 | 143.0 | 1016.5 | 1016.5 | 559.5 | 357.0 | 101 |

As shown in Table 1, each of the Examples is configured such that the $CO_2$ concentration in the non-permeated gas of the first gas separation membrane unit 11 is 5 mol % or less, the $CH_4$ recovery rate is 98% or higher, and the amount of permeated gas (F2) fed to the second gas separation membrane unit per unit time is 60% or less of the amount of material gas (F1) fed to the first gas separation membrane unit per unit time. Table 1 shows that, with the gas separation systems of the respective Examples, an increase in compression power is suppressed, even when the total number of modules in the first and second gas separation membrane units is small.

In contrast, according to Table 2, in cases where the gas separation selectivity $P'_{CO2}/P'_{CH4}$ of the first gas separation membrane unit and the second gas separation membrane unit is below 30, a comparison between, for example, Example 1-1 and Comparative Example 1-1 or between Example 2-1 and Comparative Example 2-1 reveals that Comparative Examples 1-1 and 2-1—which employ the same number of modules as in Examples 1-1 and 2-1—have high $CO_2$ concentrations exceeding 5 mol % in the non-permeated gas of the first gas separation membrane unit 11.

Further, Comparative Examples 1-1 to 1-5 in Table 2 show that, with a reduced number of modules, the $CH_4$ gas purity in the non-permeated gas of the first gas separation membrane unit drops significantly, and also F2/F1 (the compression power of the second compression means 22) increases. In contrast, Examples 1-1 to 1-5 in Table 1 show that, even with a reduced number of modules, deterioration of $CH_4$ gas purity in the non-permeated gas of the first gas separation membrane unit, as well as increase in F2/F1 (the compression power of the second compression means 22), is significantly suppressed. A comparison between Examples 2-1 to 2-5 in Table 1 and Comparative Examples 2-1 to 2-5 in Table 2 shows similar results.

Further, the results of Comparative Examples 3-1 to 5-2 in Table 2 show that, in cases where the gas separation selectivity $P'_{CO2}/P'_{CH4}$ of the first gas separation membrane unit and the second gas separation membrane unit is below 30, significantly increasing the number of modules can improve the $CH_4$ gas purity in the non-permeated gas of the first gas separation membrane unit, but this increases F2/F1, thereby leading to an increase in the compression power of the second compression means 22.

Further, the results of Table 3 show that, according to the system of FIG. 3—e.g., according to Comparative Examples 6-1 to 6-5 in which the conditions regarding separation selectivity and membrane area of the gas separation membrane correspond to the conditions of Examples 1-1 to 1-5—the $CO_2$ concentration in the non-permeated gas of the second gas separation membrane unit 12 becomes high, thus leading to a deterioration in $CH_4$ purity in the non-permeated gas of the second gas separation membrane unit 12, which is the product gas. It can also be understood that, according to the conditions of Comparative Examples 6-1 to 6-5, reducing the membrane area of the first gas separation membrane unit 11 increases compression power and also impairs product purity.

Similarly, according to, for example, Comparative Examples 7-2 to 7-5 in which the conditions regarding separation selectivity and membrane area of the gas separation membrane are similar to the conditions of Examples 2-1 to 2-5, as well as Comparative Examples 8-1 and 8-2 in which the conditions regarding separation selectivity and membrane area of the gas separation membrane are similar to the conditions of Examples 3-1 to 3-6, the results show that reducing the membrane area of the first gas separation membrane unit 11 increases compression power and also impairs product purity.

Examples 4-1 to 4-17

The configuration was the same as in Example 1-1, except that the volume ratio $CO_2/CH_4$ was changed as shown in Table 4 and the number of modules constituting each unit was changed as shown in Table 4. Table 4 shows the feed flow rates to the respective units. Table 4 also shows the composition of the non-permeated gas of the first gas separation membrane unit 11, the $CH_4$ recovery rate (Rcv.; %), the flow rates of permeated gas and non-permeated gas of each unit, the feed flow rate ratio (F2/F1), the compression power of the second compression means 22, and the total compression power.

TABLE 4

| Example No. | $CO_2/CH_4$ | $P'CO_2/P'CH_4$ | First unit Modules Number | Second unit Modules Number | Composition of non-permeated gas of first unit [mol%] | | $CH_4$ recovery rate Rcv.[%] | Material Nm3/h | First unit Feed (F1) Nm3/h |
|---|---|---|---|---|---|---|---|---|---|
| | | | | | CO2 | CH4 | | | |
| 4-1 | 50/50 | 61.91 | 70 | 12 | 2.22 | 97.78 | 98.13 | 500.0 | 539.9 |
| 4-2 | | | 70 | 11 | 2.24 | 97.76 | 98.42 | 500.0 | 542.0 |
| 4-3 | | | 70 | 10 | 2.27 | 97.73 | 98.71 | 500.0 | 545.2 |
| 4-4 | | | 70 | 9 | 2.32 | 97.68 | 99.01 | 500.0 | 551.6 |
| 4-5 | 30/70 | | 70 | 12 | 3.18 | 96.82 | 98.17 | 500.0 | 538.2 |
| 4-6 | | | 70 | 11 | 3.20 | 96.80 | 98.37 | 590.0 | 539.4 |
| 4-7 | | | 70 | 10 | 3.21 | 96.79 | 98.58 | 500.0 | 540.8 |
| 4-8 | | | 70 | 9 | 3.23 | 96.77 | 98.79 | 500.0 | 542.5 |
| 4-9 | | | 70 | 8 | 3.26 | 96.74 | 950.0 | 500.0 | 544.8 |
| 4-10 | | | 70 | 7 | 3.30 | 96.70 | 99.20 | 500.0 | 548.4 |
| 4-11 | | | 74 | 8 | 2.92 | 97.08 | 99.00 | 500.0 | 548.3 |
| 4-12 | | | 76 | 9 | 2.74 | 97.26 | 98.80 | 500.0 | 547.4 |
| 4-13 | | | 72 | 8 | 3.09 | 96.91 | 990.0 | 500.0 | 546.5 |
| 4-14 | | | 76 | 8 | 2.77 | 97.23 | 99.01 | 500.0 | 550.1 |
| 4-15 | | | 70 | 9 | 3.23 | 96.77 | 98.79 | 500.0 | 542.5 |
| 4-16 | | | 72 | 9 | 3.08 | 96.94 | 98.79 | 509.0 | 544.1 |
| 4-17 | | | 74 | 9 | 2.90 | 97.10 | 98.80 | 509.0 | 545.8 |

| Example No. | First unit | | Second unit | | | F2/F1 | Compression power of compression means 22 kW | Total compression power kW |
|---|---|---|---|---|---|---|---|---|
| | Permeated Nm3/h | Non-permeated Nm3/h | Feed (F2) Nm3/h | Permeated Nm3/h | Non-permeated Nm3/h | | | |
| 4-1 | 289.0 | 250.9 | 289.0 | 249.1 | 39.9 | 54% | 23 | 67 |
| 4-2 | 290.3 | 251.7 | 290.3 | 246.3 | 42.0 | 54% | 23 | 67 |
| 4-3 | 292.7 | 252.5 | 292.7 | 247.5 | 45.2 | 54% | 23 | 67 |
| 4-4 | 298.2 | 253.4 | 298.2 | 246.6 | 51.6 | 54% | 24 | 67 |
| 4-5 | 183.4 | 354.9 | 183.4 | 145.1 | 38.2 | 34% | 15 | 58 |
| 4-6 | 183.2 | 355.7 | 123.8 | 144.3 | 39.4 | 34% | 15 | 58 |
| 4-7 | 184.3 | 356.5 | 184.3 | 143.5 | 40.8 | 34% | 15 | 58 |
| 4-8 | 185.2 | 357.3 | 185.2 | 142.7 | 42.5 | 34% | 15 | 58 |
| 4-9 | 186.6 | 355.2 | 186.6 | 141.8 | 44.8 | 34% | 15 | 59 |
| 4-10 | 189.3 | 359.1 | 189.3 | 140.9 | 48.4 | 35% | 15 | 59 |
| 4-11 | 191.3 | 356.9 | 191.3 | 143.1 | 49.3 | 35% | 15 | 59 |
| 4-12 | 191.9 | 355.5 | 191.9 | 144.5 | 47.4 | 35% | 15 | 59 |
| 4-13 | 189.0 | 357.5 | 189.0 | 142.5 | 40.5 | 35% | 15 | 59 |

TABLE 4-continued

| | | | | | | | | |
|---|---|---|---|---|---|---|---|---|
| 4-14 | 193.7 | 356.4 | 193.7 | 143.6 | 50.1 | 35% | 16 | 59 |
| 4-15 | 185.2 | 357.3 | 185.2 | 142.7 | 42.5 | 34% | 15 | 59 |
| 4-16 | 187.4 | 356.7 | 187.4 | 143.3 | 44.1 | 34% | 15 | 59 |
| 4-17 | 189.7 | 356.1 | 189.7 | 143.9 | 453 | 35% | 15 | 59 |

Table 4 shows that, regardless of the volume ratio $CO_2/CH_4$ of the material, the present invention can suppress an increase in the required compression power even when the membrane area is reduced compared to conventional gas separation systems, while achieving a high recovery rate and high purity of $CH_4$.

Examples 5-1 to 5-6

The configuration was the same as in Example 1-1, except that the number of gas separation membrane modules constituting the first gas separation membrane unit 11 and the second gas separation membrane unit 12 was set to the number shown in Table 5. Table 5 shows the feed flow rates to the respective units. Table 5 also shows the composition of the non-permeated gas of the first gas separation membrane unit 11, the $CH_4$ recovery rate (Rcv.; %), the flow rates of permeated gas and non-permeated gas of each unit, the feed flow rate ratio (F2/F1), the compression power of the second compression means 22, and the total compression power.

Examples 6-1 to 6-7 and 7-1 to 7-7

The configuration was the same as in Example 3-1, except that the number of gas separation membrane modules constituting the first gas separation membrane unit 11 and the second gas separation membrane unit 12 was set to the number shown in Table 5. Table 5 shows the feed flow rates to the respective units. Table 5 also shows the composition of the non-permeated gas of the first gas separation membrane unit 11, the $CH_4$ recovery rate (Rcv.; %), the flow rates of permeated gas and non-permeated gas of each unit, the feed flow rate ratio (F2/F1), the compression power of the second compression means 22, and the total compression power.

Examples 8-1 to 8-11

Each of the first and second gas separation membrane units 11, 12 was constituted by a plurality of modules connected in parallel, each module being constituted by a gas separation membrane module that houses, in a casing, a gas separation membrane constituted by polyimide hollow-fiber membranes and having $P'CO_2$ of $6.79 \times 10^{-5}$ cm$^3$ (STP)/(cm$^2$·sec·cmHg), $P'_{CH4}$ of $0.16 \times 10^{-5}$ cm$^3$ (STP)/(cm$^2$·sec·cmHg), and a gas separation selectivity $P'_{CO2}/P'_{CH4}$ of 43.70. The number of gas separation membrane modules in each of the first gas separation membrane unit 11 and the second gas separation membrane unit 12 was set to the number shown in Table 5. Other than the above, the configuration was the same as in Example 1-1. Table 5 shows the feed flow rates to the respective units. Table 5 also shows the composition of the non-permeated gas of the first gas separation membrane unit 11, the $CH_4$ recovery rate (Rcv.; %), the flow rates of permeated gas and non-permeated gas of each unit, the feed flow rate ratio (F2/F1), the compression power of the second compression means 22, and the total compression power.

TABLE 5

| Example No. | $P'CO2/P'CH4$ | First unit Modules Number | Second unit Modules Number | Composition of non-permeated gas of first unit [mol%] CO2 | CH4 | $CH_4$ recovery rate Rev.[%] | Material Nm3/h | First unit Feed (F1) Nm3/h |
|---|---|---|---|---|---|---|---|---|
| 5-1 | 61.91 | 60 | 12 | 3.93 | 96.07 | 98.13 | 500.0 | 531.5 |
| 5-2 | | 60 | 11 | 3.95 | 96.05 | 98.17 | 500.0 | 532.7 |
| 5-3 | | 60 | 10 | 3.97 | 96.03 | 98.61 | 500.0 | 534.2 |
| 5-4 | | 60 | 9 | 4.00 | 96.00 | 98.86 | 500.0 | 536.1 |
| 5-5 | | 60 | 8 | 4.03 | 95.97 | 99.10 | 500.0 | 539.2 |
| 5-6 | | 60 | 7 | 4.11 | 95.89 | 99.14 | 500.0 | 546.2 |
| 6-1 | 54.93 | 60 | 13 | 4.60 | 95.40 | 98.01 | 500.0 | 530.3 |
| 6-2 | | 60 | 12 | 4.62 | 95.38 | 98.25 | 500.0 | 532.0 |
| 6-3 | | 60 | 11 | 4.65 | 95.35 | 98.49 | 500.0 | 533.4 |
| 6-4 | | 60 | 10 | 4.67 | 95.33 | 98.74 | 500.0 | 535.3 |
| 6-5 | | 60 | 9 | 4.72 | 95.28 | 98.98 | 500.0 | 538.1 |
| 6-6 | | 60 | 8 | 4.79 | 95.21 | 99.22 | 500.0 | 543.7 |
| 6-7 | | 60 | 7 | 4.98 | 95.02 | 99.46 | 500.0 | 558.4 |
| 7-1 | | 70 | 13 | 3.39 | 96.61 | 98.04 | 500.0 | 538.2 |
| 7-4 | | 70 | 12 | 3.41 | 96.59 | 98.28 | 500.0 | 539.7 |
| 7-3 | | 70 | 11 | 3.43 | 96.57 | 98.52 | 500.0 | 541 6 |
| 7-4 | | 70 | 10 | 3.46 | 96.54 | 98.76 | 500.0 | 544.2 |
| 7-5 | | 70 | 9 | 3.51 | 96.49 | 99.01 | 500.0 | 548.3 |
| 7-6 | | 70 | 8 | 3.60 | 96.40 | 99.25 | 500.0 | 557.5 |
| 7-7 | | 70 | 7 | 3.82 | 96.18 | 99.49 | 500.0 | 580.4 |
| 8-1 | 43.70 | 70 | 14 | 4.65 | 95.35 | 98.05 | 500.0 | 538.3 |
| 8-2 | | 70 | 13 | 4.68 | 95.32 | 98.29 | 500.0 | 540.2 |
| 8-3 | | 70 | 12 | 4.72 | 95.28 | 98.54 | 500.0 | 542.6 |
| 8-4 | | 70 | 11 | 4.78 | 95.22 | 98.78 | 500.0 | 546.3 |
| 8-5 | | 70 | 10 | 4.88 | 95.12 | 99.02 | 500.0 | 552.9 |
| 8-6 | | 80 | 14 | 3.54 | 96.46 | 98.08 | 500.0 | 546.7 |

TABLE 5-continued

| | | | | | | | |
|---|---|---|---|---|---|---|---|
| 8-7 | | 80 | 13 | 3.58 | 96.42 | 98.32 | 500.0 | 549.1 |
| 8-8 | | 80 | 12 | 3.62 | 96.38 | 98.57 | 500.0 | 552.5 |
| 8-9 | | 80 | 11 | 3.69 | 96.31 | 98.81 | 500.0 | 558.0 |
| 8-10 | | 80 | 10 | 3.80 | 96.20 | 99.05 | 500.0 | 567.6 |
| 8-11 | | 80 | 9 | 4.01 | 95.99 | 99.29 | 500.0 | 586.5 |

| | First unit | | Second unit | | | | Compression power of compression means 22 kW | Total compression power kW |
|---|---|---|---|---|---|---|---|---|
| Example No. | Permeated Nm3/h | Non-permeated Nm3/h | Feed (F2) Nm3/h | Permeated Nm3/h | Non-permeated Nm3/h | F2/F1 | | |
| 5-1 | 225.1 | 306.4 | 225.1 | 1936 | 31.5 | 42% | 18 | 62 |
| 5-2 | 225.4 | 307.3 | 225.4 | 192.3 | 32.7 | 42% | 18 | 62 |
| 5-3 | 226.1 | 308.1 | 226.1 | 191.9 | 34.2 | 42% | 18 | 62 |
| 5-4 | 227.2 | 308.9 | 227.2 | 191.1 | 36.1 | 42% | 18 | 82 |
| 5-5 | 229.4 | 309.8 | 229.4 | 190.2 | 39.2 | 43% | 18 | 62 |
| 5-6 | 235.4 | 310.8 | 235.4 | 189.2 | 46.2 | 43% | 19 | 62 |
| 6-1 | 222.5 | 308.2 | 222.5 | 191.8 | 30.8 | 42% | 18 | 61 |
| 6-2 | 222.9 | 309.0 | 222.9 | 191.0 | 32.0 | 42% | 18 | 61 |
| 6-3 | 223.5 | 309.9 | 223.5 | 190.1 | 33.4 | 42% | 18 | 62 |
| 6-4 | 224.5 | 310.7 | 224.5 | 189.3 | 35.3 | 42% | 18 | 62 |
| 6-5 | 226.4 | 311.6 | 226.4 | 188.4 | 38.1 | 42% | 18 | 62 |
| 6-6 | 231.0 | 312.6 | 231.0 | 187.4 | 43.7 | 42% | 18 | 62 |
| 6-7 | 244.3 | 314.0 | 244.3 | 186 0 | 58.4 | 44% | 20 | 63 |
| 7-1 | 233.8 | 304.4 | 233.8 | 195.6 | 38.2 | 43% | 19 | 62 |
| 7-4 | 234.5 | 305.2 | 234.5 | 194.8 | 39.7 | 43% | 19 | 62 |
| 7-3 | 235.5 | 306.1 | 235.5 | 153.9 | 41.6 | 43% | 19 | 62 |
| 7-4 | 237.2 | 306.9 | 237.2 | 193.1 | 44.2 | 44% | 19 | 83 |
| 7-5 | 240.7 | 307.8 | 240.7 | 152.2 | 48.5 | 44% | 19 | 63 |
| 7-6 | 248.7 | 308.9 | 248.7 | 191.1 | 57.5 | 45% | 20 | 64 |
| 7-7 | 270.1 | 310.3 | 270.1 | 189.7 | 80.4 | 47% | 22 | 95 |
| 8-1 | 229.8 | 308.5 | 229.8 | 191.5 | 38.3 | 43% | 18 | 62 |
| 8-2 | 230.8 | 309.4 | 230.8 | 190.6 | 40.2 | 43% | 18 | 62 |
| 8-3 | 232.3 | 310.3 | 232.3 | 189.7 | 42.6 | 43% | 19 | 62 |
| 8-4 | 235.1 | 311.2 | 235.1 | 188.8 | 46.3 | 43% | 19 | 82 |
| 8-5 | 240.6 | 312.3 | 240.6 | 187.7 | 52.9 | 44% | 19 | 63 |
| 8-6 | 241.6 | 305.1 | 241.6 | 194.9 | 46.7 | 44% | 19 | 63 |
| 8-7 | 243.2 | 305.9 | 243.2 | 194.1 | 49.1 | 44% | 19 | 63 |
| 8-8 | 245.7 | 306.8 | 245.7 | 193.2 | 52.5 | 44% | 20 | 63 |
| 8-9 | 250.2 | 307.9 | 250.2 | 192.2 | 58.0 | 45% | 20 | 64 |
| 8-10 | 258.8 | 308.9 | 256.8 | 191.1 | 67.6 | 46% | 21 | 64 |
| 8-11 | 276.2 | 310.3 | 276.2 | 189.7 | 86.5 | 47% | 22 | 66 |

INDUSTRIAL APPLICABILITY

The present invention provides a gas separation system for separating methane, as well as a methane enriched gas production method, capable of suppressing the required compression power compared to conventional gas separation systems and also reducing membrane area, while achieving a high recovery rate and high purity of $CH_4$.

The invention claimed is:

1. A gas separation system for producing a $CH_4$ enriched gas from a material gas containing $CO_2$ and $CH_4$, the gas separation system comprising:
    a first gas separation membrane unit; and
    a second gas separation membrane unit, wherein:
    each gas separation membrane unit includes at least a gas inlet port, a permeated gas discharge port, and a non-permeated gas discharge port;
    the gas separation system comprises
        a material gas feed line connected to the gas inlet port of the first gas separation membrane unit,
        a compression means interposed to the material gas feed line,
        a first connection line connecting the permeated gas discharge port of the first gas separation membrane unit and the gas inlet port of the second gas separation membrane unit,
        a second compression means interposed in midstream of the first connection line, and
        a second connection line connecting the non-permeated gas discharge port of the second gas separation membrane unit and the material gas feed line;
    the first gas separation membrane unit and the second gas separation membrane unit each have a gas separation selectivity $P'_{CO_2}/P'_{CH_4}$ of 30 or greater;
    a ratio S1/S2 of membrane area S1 of the first gas separation membrane unit to membrane area S2 of the second gas separation membrane unit is from 4.6 to 12; and
    a recovery rate of $CH_4$ is 98% or higher; $CO_2$ content in non-permeated gas discharged from the non-permeated gas discharge port of the first gas separation membrane unit is 5 mol % or less; the pressure of gas to be fed to the second gas separation membrane unit is higher than the pressure of gas to be fed to the first gas separation membrane unit; and an amount of gas fed to the second gas separation membrane unit per unit time is 60% or less of an amount of the material gas fed to the first gas separation membrane unit per unit time.

2. The gas separation system according to claim 1, further comprising:
    a first extraction line connected to the non-permeated gas discharge port of the first gas separation membrane unit, the first extraction line being used to extract the non-permeated gas to outside the system from the non-permeated gas discharge port; and a second extraction line connected to the permeated gas discharge port of the second gas separation membrane unit, the second extraction line being used to extract permeated gas to outside the system from the permeated gas discharge port.

3. The gas separation system according to claim 1, wherein the material gas is a biogas.

4. The gas separation system according to claim 1, wherein, in the material gas, $CH_4$ content is from 40 to 80 vol % and $CO_2$ content is from 20 to 60 vol %.

5. The gas separation system according to claim 1, wherein the first gas separation membrane unit and the second gas separation membrane unit each include a gas separation membrane constituted by a polyimide hollow-fiber membrane.

6. A method for producing a $CH_4$ enriched gas from a material gas containing $CO_2$ and $CH_4$ by using a gas separation system, the method comprising:

using, as the gas separation system, a gas separation system comprising a first gas separation membrane unit and a second gas separation membrane unit, wherein:

each gas separation membrane unit includes at least a gas inlet port, a permeated gas discharge port, and a non-permeated gas discharge port;

the gas separation system comprises
  a material gas feed line connected to the gas inlet port of the first gas separation membrane unit,
  a compression means interposed to the material gas feed line,
  a first connection line connecting the permeated gas discharge port of the first gas separation membrane unit and the gas inlet port of the second gas separation membrane unit,
  a second compression means interposed in midstream of the first connection line, and
  a second connection line connecting the non-permeated gas discharge port of the second gas separation membrane unit and the material gas feed line;

the first gas separation membrane unit and the second gas separation membrane unit each have a gas separation selectivity $P'_{CO2}/P'_{CH4}$ of 30 or greater; and a ratio S1/S2 of membrane area S1 of the first gas separation membrane unit to membrane area S2 of the second gas separation membrane unit is from 4.6 to 12; and operating the gas separation system such that: a recovery rate of $CH_4$ is 98% or higher; $CO_2$ content in non-permeated gas discharged from the non-permeated gas discharge port of the first gas separation membrane unit is 5 mol % or less; the pressure of gas to be fed to the second gas separation membrane unit is higher than the pressure of gas to be fed to the first gas separation membrane unit; and an amount of permeated gas discharged from the first gas separation membrane unit per unit time is 60% or less of an amount of the material gas fed to the first gas separation membrane unit per unit time.

7. The gas separation system according to claim 2, wherein the material gas is a biogas.

8. The gas separation system according to claim 2, wherein, in the material gas, $CH_4$ content is from 40 to 80 vol % and $CO_2$ content is from 20 to 60 vol %.

9. The gas separation system according to claim 3, wherein, in the material gas, $CH_4$ content is from 40 to 80 vol % and $CO_2$ content is from 20 to 60 vol %.

10. The gas separation system according to claim 7, wherein, in the material gas, $CH_4$ content is from 40 to 80 vol % and $CO_2$ content is from 20 to 60 vol %.

11. The gas separation system according to claim 2, wherein the first gas separation membrane unit and the second gas separation membrane unit each include a gas separation membrane constituted by a polyimide hollow-fiber membrane.

12. The gas separation system according to claim 3, wherein the first gas separation membrane unit and the second gas separation membrane unit each include a gas separation membrane constituted by a polyimide hollow-fiber membrane.

13. The gas separation system according to claim 4, wherein the first gas separation membrane unit and the second gas separation membrane unit each include a gas separation membrane constituted by a polyimide hollow-fiber membrane.

14. The gas separation system according to claim 7, wherein the first gas separation membrane unit and the second gas separation membrane unit each include a gas separation membrane constituted by a polyimide hollow-fiber membrane.

15. The gas separation system according to claim 8, wherein the first gas separation membrane unit and the second gas separation membrane unit each include a gas separation membrane constituted by a polyimide hollow-fiber membrane.

16. The gas separation system according to claim 9, wherein the first gas separation membrane unit and the second gas separation membrane unit each include a gas separation membrane constituted by a polyimide hollow-fiber membrane.

17. The gas separation system according to claim 10, wherein the first gas separation membrane unit and the second gas separation membrane unit each include a gas separation membrane constituted by a polyimide hollow-fiber membrane.

* * * * *